May 21, 1935.　　　　　G. A. LYON　　　　　2,001,967
UNITARY TIRE COVER
Filed June 8, 1931　　　3 Sheets-Sheet 1
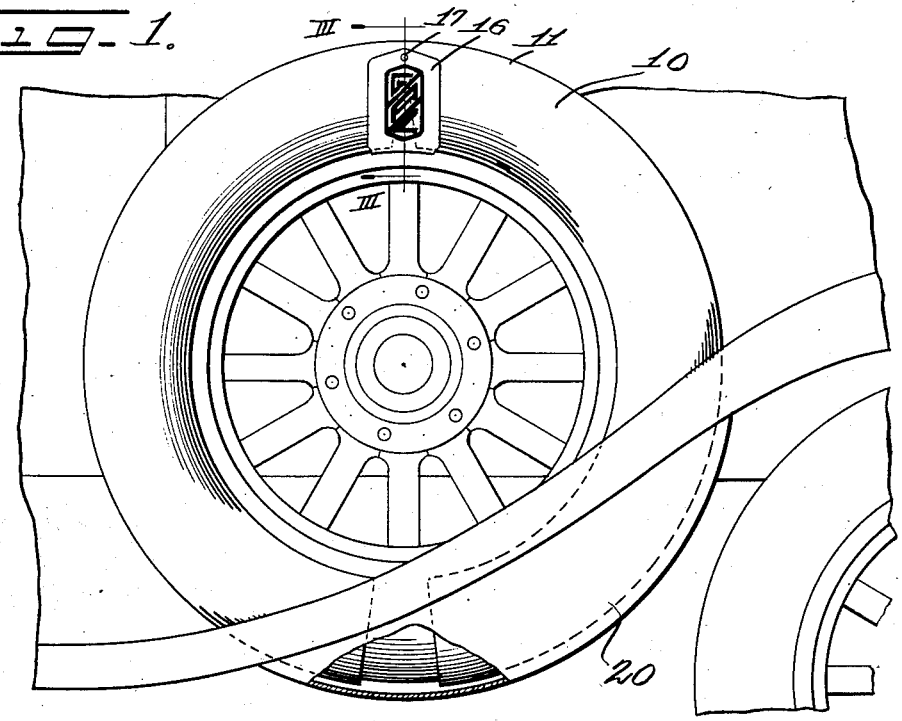
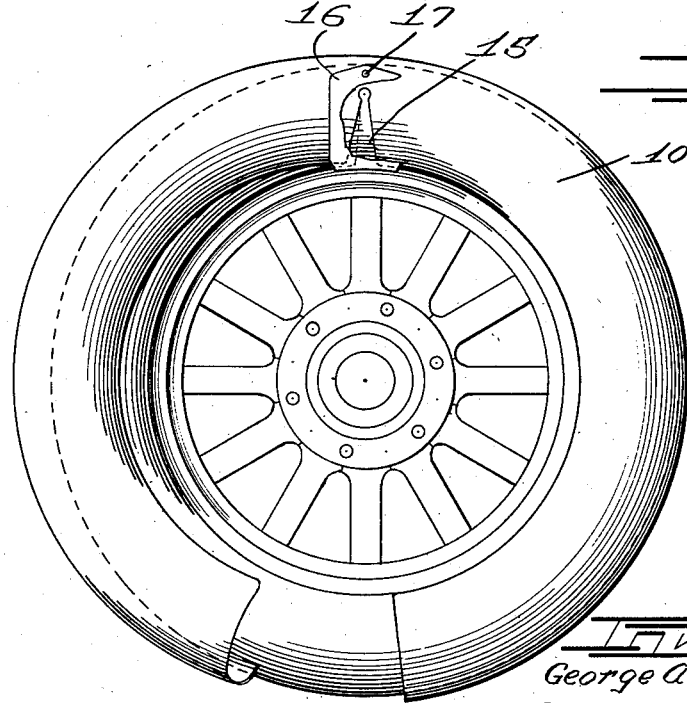
Inventor
George Albert Lyon.

May 21, 1935.  G. A. LYON  2,001,967
UNITARY TIRE COVER
Filed June 8, 1931  3 Sheets-Sheet 2
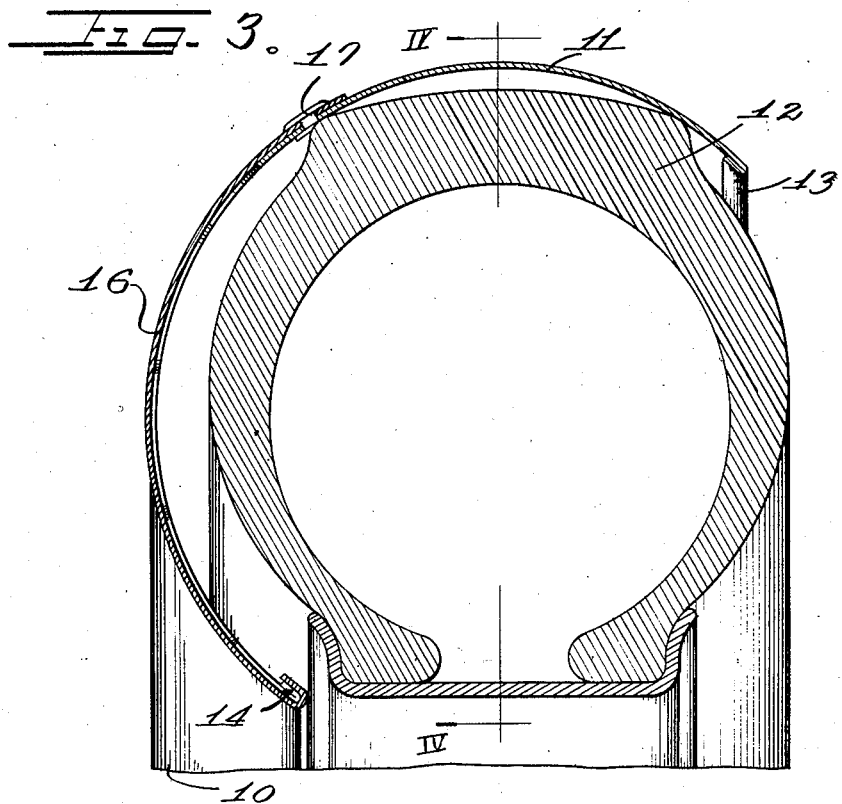
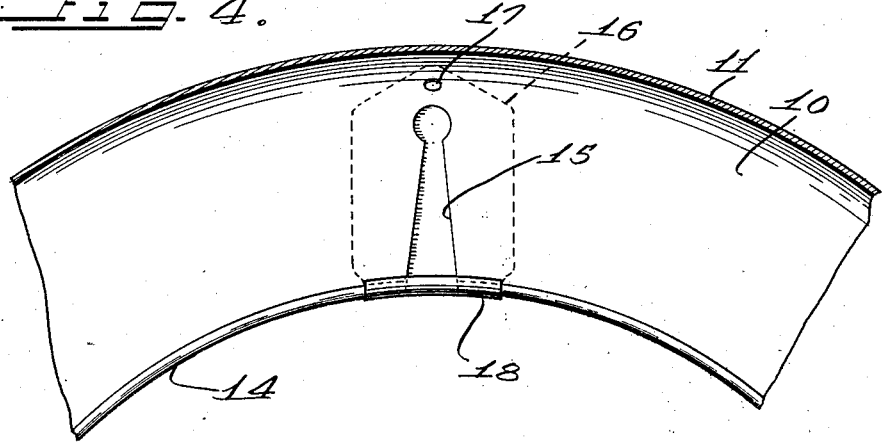
Inventor
George Albert Lyon.
by Charles O. Sills Attys.

May 21, 1935. G. A. LYON 2,001,967
UNITARY TIRE COVER
Filed June 8, 1931 3 Sheets-Sheet 3
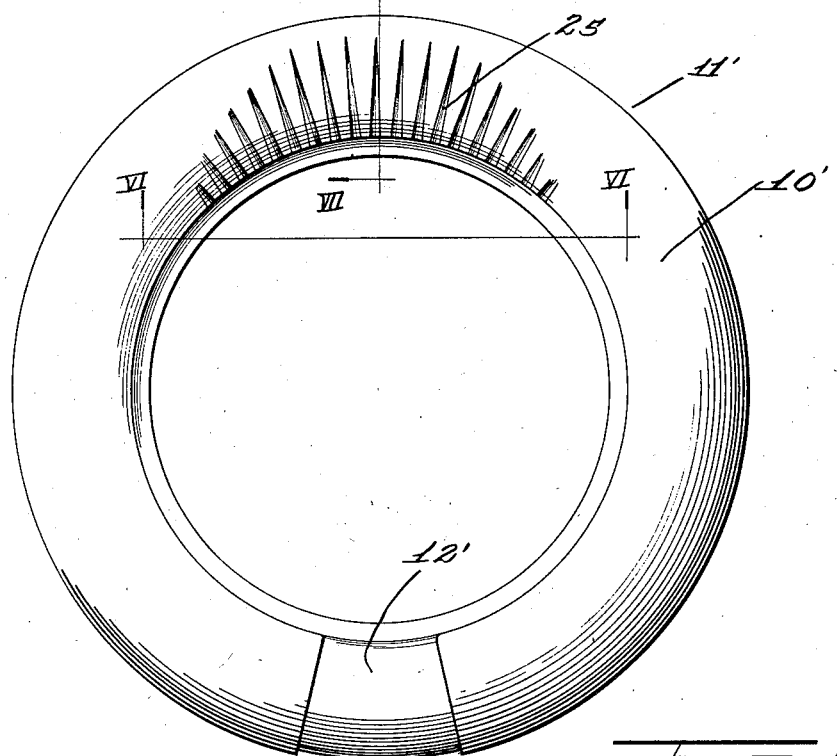
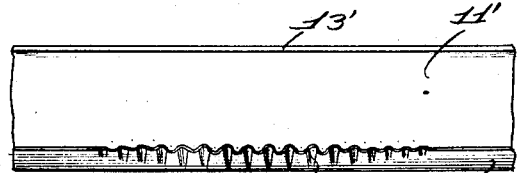
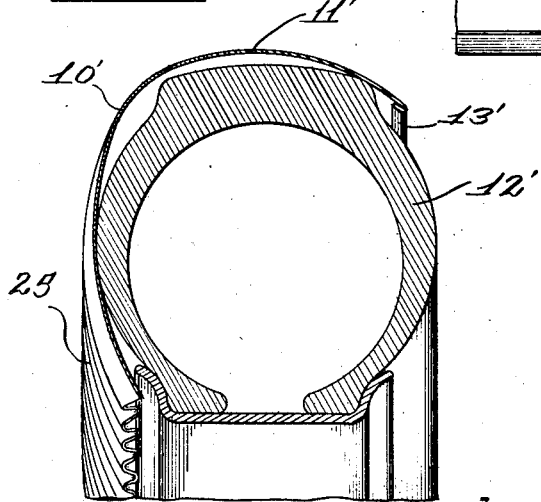
Inventor
George Albert Lyon.
by Charles M. Will
Attys.

Patented May 21, 1935

2,001,967

UNITED STATES PATENT OFFICE 2,001,967

UNITARY TIRE COVER

George Albert Lyon, Allenhurst, N. J., assignor to Lyon Incorporated, Asbury Park, N. J., a corporation of Delaware Application June 8, 1931, Serial No. 542,791

4 Claims. (Cl. 150—54)

My present invention relates to tire covers and more particularly to a tire cover of the unitary type.

An object of this invention is to provide an improved simple and inexpensive cover of a unitary construction and adapted to be mounted on the tire with a minimum of effort on the part of the person applying the cover thereto.

Another object of the invention is to provide a unitary tire cover formed to be readily mounted upon the tire by the shoving of the cover thereon and adapted to be self-retained on the tire once it is properly positioned thereon.

I have found from my experimentation with unitary tire covers that considerable difficulty is incurred in the mounting of the cover on the tire where the cover is made of relatively stiff sheet material such as metal sheet and has a circumferential inner margin or flange adapted to be disposed on the rear side of the spare tire and to extend inwardly from the outermost periphery or tread of the tire. In fact, in order to snap this rear marginal portion of the cover over the tread of the tire it is necessary that either the rim or peripheral portion of the cover be split or formed open so as to yield or that the cover be provided with some other yieldable characteristic whereby the inner marginal portion thereof may be expanded over the tread and thereafter contracted into cover retaining position.

As a result of my experimentation the cover disclosed in the present application was devised in which cover I am the first to the best of my knowledge to ever provide means permitting the relatively stiff end portion of the split cover to be spread apart to an extent sufficient to enable the inner marginal portion of the cover to be moved over the tread of the tire and thereafter contracted into cover retaining cooperation therewith. The means provided is so arranged and constituted as to permit of a considerable latitude of movement of the ends of the cover apart without requiring the use of a material with a higher degree of flexibility than that present in sheet metal.

In accordance with the general features of my invention there is provided a metallic tire cover comprising integral side and peripheral portions arranged so that the side portion is adapted to cover the outer side wall of the tire and the peripheral portion is adapted to extend over the tread of the tire, these integral portions being split at one end or in other words provided with an open bottom and the side portion having a slot substantially diametrically opposite the open bottom of the cover adapted to permit a spreading of the ends of the cover portions away from each other so that the rear marginal flange of the peripheral portion may be moved over the tread of the tire and thereafter allowed to contract and embrace the tire at the rear side of the tread for retaining the cover against accidental displacement from the tire.

Another feature of the invention relates to the use of an ornamental plate for covering the slot or opening in the side portion of the cover and adapted to have ornamental matter formed thereon to enhance the appearance of the cover.

Still a further feature of the invention relates to the provision of a cover of the above described specific construction with the exception that instead of a slot there is provided in the side portion of the cover a plurality of corrugations to take the place of the slot for permitting separation of the ends of the cover as the cover is being shoved onto the tire into proper tire protecting position.

Other objects and features of this invention will more fully appear from the following detailed description taken in connection with the accompanying drawings which illustrate several embodiments thereof and in which Figure 1 is a side view of my novel tire cover illustrating it as being applied to a spare tire in a fender well of an automobile;

Figure 2 is a view of the cover similar to Figure 1 with the exception that the plate over the slot in the side of the cover is broken away to show the slot and one end section of the unitary cover is illustrated as being spread away from the other end section to illustrate how the cover may be mounted on the tire;

Figure 3 is an enlarged cross sectional view taken on substantially the line III—III of Figure 1;

Figure 4 is an enlarged fragmentary sectional view taken on the line IV—IV of Figure 3 looking in the direction indicated by the arrows and illustrating the construction and position of the slot in the side wall of the cover;

Figure 5 is a side view of a modified form of cover showing corrugations substituted for the slot and illustrating the cover as being applied to a tire;

Figure 6 is a fragmentary view taken on substantially the line VI—VI of Figure 5 looking upwardly illustrating the arrangement of the corrugations, and Figure 7 is an enlarged cross sectional view taken on the line VII—VII of Figure 5 looking in the direction indicated by the arrows.

The form of cover illustrated in Figures 1 to 4 inclusive comprises a side portion 10 for covering a side wall of the tire and a peripheral portion 11 extending transversely from the side portion 10 and adapted to cover the outer periphery or tread of the tire 12. Both of these portions are made of a concavo-convex shape so as to conform with the contour of the respective parts of the tire 12 over which these portions are adapted to extend. Further these portions are integral and are made from relatively stiff sheet material such for example as sheet metal. This unitary construction may be punched, spun or otherwise fabricated from the sheet material.

In Figure 3 it will be noted that the curved tread covering peripheral portion 11 has its inner margin formed to extend inwardly of the tread of the tire and is turned as indicated at 13. Also the edge of the side portion 10 is provided with a turned strip as indicated at 14.

These two integral portions do not comprise a complete circle but rather together comprise a split ring the ends of which are normally slightly spaced apart as shown in Figure 1 so that in other words the unitary cover in reality is provided with an open bottom.

Now it will of course be appreciated that if this unitary cover structure is made of relatively stiff material such as metal sheet considerable difficulty will be experienced in getting the cover into proper tire protecting position on the tire due to the fact that the inner circumferential margin 13 of the portion 11 must be spread in order to get it over the tread of the tire 12. This fact is true irrespective of the fact that the cover is made in the form of a split ring and it will be appreciated therefore that unless some provision is made to enable the fitting of the inner margin of the portion 11 over the tread of the tire the cover will be buckled and otherwise damaged in its application to the tire.

In accordance with the features of this invention I therefore provide the cover with an aperture or slot as indicated at 15 which slot is disposed in the side portion 10 of the unitary cover and is preferably positioned diametrically opposite the slit in or the open bottom of the cover as best shown in Figures 1 and 2. I have attained best results by making the slot 15 in the form illustrated namely in the shape of a wedge with the point of the wedge toward the outer periphery of the cover. Also in order to enhance the appearance of the unitary cover this slot 15 may be normally covered up by a small plate 16 to which any ornamental matter may be applied such for example as the initials of the owner of the automobile carrying the spare tire and cover. The cover 16 may be secured by means of a pin 17 disposed between the outer periphery of the cover and the point of the wedge-like slot 15.

In Figure 4 it will also be noted that one end of the plate 16 spans the widest portion of the slot 15 and is bent inwardly as indicated at 18 so as to form a turned back portion into which are fitted the adjacent portions of the turned edge 14 alongside the side walls of the slot 15. This turned back portion 18 of the plate 16 serves to hold the separated sections of the turned edge 14 in proper alignment and against lateral displacement relative to each other.

Now in applying this unitary split ring-like cover of my invention to the tire one-half of the cover is flexed laterally and outwardly away from the other half so as to permit said latter half to be fitted on the tire as shown in Figure 2. When this latter half is so positioned on the tire the other half will be in substantially the full line position shown in Figure 2. Obviously this movement of the first mentioned half of the cover laterally and outwardly permits the inner marginal edge 13 of the other half to be properly disposed over the tread of the tire. Thereafter the aforementioned last half of the cover may be flexed onto the tire in such a way as to allow the inner marginal edge 13 thereof to be passed over the tread of the tire onto the rear side of the tread and then the resiliency of the material causes said half to assume the dotted line position shown in Figure 2.

From the foregoing description of the application of my cover to the tire it will be noted that what I have in reality done is to provide a pivot point at the central portion of the ring diametrically opposite the open bottom or slit thereof whereby one-half of the ring may be flexed outwardly and laterally relative to the other to permit disposition of one-half of the ring-like cover on the tire and the subsequent position of the other ring-like half onto the tire when said latter half is free to contract on the tire whereby the cover is self-retained on the tire.

This cover of my invention is self-retaining on the tire to the extent that the inner marginal edge 13 on the outer peripheral portion 11 serves to prevent accidental lateral displacement of the cover from the tire and hence the cover can only be removed by a separation of the ends of the halves going to make up the ring-like cover.

Once the cover is mounted on the tire and disposed in the fender well such as the fender well 20 illustrated in Figure 1 the ends of the halves of the ring-like cover will be disposed in the well and if the spare tire is locked against removal from the well the cover is necessarily also locked against removal from the tire.

In Figures 5, 6, and 7 I have illustrated a modified form of cover in which instead of using a slot such as the slot 15 of my preferred form of cover I have substituted therefor a plurality of corrugations 25. These corrugations are disposed in the side portion 10' which is like in the preferred form of cover formed integral with a peripheral or tread covering portion 11'. Both of these portions 10' and 11' are concavo-convex in shape and the portion 11' has an inwardly extending turned marginal flange 13' at its rear side adapted for disposition below the outer periphery of the tire 12'.

The two portions 10' and 11' are formed integral from sheet metal and together comprise a unitary split ring-like structure.

The corrugations 25 are disposed diametrically opposite the open bottom or split end of the ring and are graduated so that the larger corrugations are at the center of the corrugated section and the smaller corrugations are at the extreme ends of the corrugated section 25.

Since this corrugated section operates to perform substantially the same functions as the slotted section of my preferred form of cover it is thought that no detailed description of the use of this specific form of cover is required in order for its use to be fully understood. All that might be noted in this regard is that this corrugated section 25 provides a pivot point at which one-half of the ring-like cover structure may be pivoted laterally with respect to the other half to permit of the ready mounting of the cover on the tire.

Now I desire it understood that although I have illustrated and described in detail several embodiments of my invention the invention is not to be thus limited but only insofar as defined by the scope and spirit of the appended claims.

I claim as my invention:

1. A tire cover comprising a split ring including tire tread and side covering portions and in which a section thereof is pivotally movable with reference to the remainder of the cover to permit said cover to be applied to the tire, said pivotal movement being provided by so forming a part of the side covering portion of said ring between its ends as to increase the flexibility of the cover at said intermediate portion, said split ring being formed to extend about substantially more than one-half of the outer periphery of the tire and said section comprising substantially one-half of the ring, the tread covering portion of the split ring being circumferentially continuous and extending laterally over the tread, the ends of the ring pivoting about an intermediate section of the tread covering portion by reason of the formation of said side portion.

2. A tire cover comprising a split ring including tire tread and side covering portions and in which a section thereof is pivotally movable with reference to the remainder of the cover to permit said cover to be applied to the tire, said pivotal movement being provided by a slot in the side covering portion of said ring between its ends as to increase the flexibility of the cover, said split ring being formed to extend about substantially more than one-half of the outer periphery of the tire and said section comprising substantially one-half of the ring and being formed to have its free ends yieldably hug the tire tread below the upper half of the tire, the tread covering portion of the split ring being circumferentially continuous and extending laterally over the tread, the ends of the ring pivoting about an intermediate section of the tread covering portion by reason of the slot in said side portion.

3. A tire cover comprising a split ring including tire tread and side covering portions and in which a section thereof is pivotally movable with reference to the remainder of the cover to permit said cover to be applied to the tire, said pivotal movement being provided by a slot substantially only in the side covering portion of said ring between its ends as to increase the flexibility of the cover, said split ring being formed to extend about substantially more than one-half of the outer periphery of the tire and said section comprising substantially one-half of the ring, both said section and the other half of the ring being formed to have their free ends yieldably hug the tire tread below the upper half of the tire, the tread covering portion of the split ring being circumferentially continuous and extending laterally over the tread, the ends of the ring pivoting about an intermediate section of the tread covering portion by reason of the slot in said side portion.

4. A tire cover comprising a split ring in which a section thereof is pivotally movable with reference to the remainder of the cover to permit said cover to be applied to the tire, said pivotal movement being provided by so forming a portion of said ring between its ends as to increase the flexibility of the material at said intermediate portion, and said intermediate section being composed of a plurality of corrugations.

GEORGE ALBERT LYON.